United States Patent
Yoshimura

(10) Patent No.: US 12,418,858 B2
(45) Date of Patent: Sep. 16, 2025

(54) INFORMATION PROCESSING APPARATUS, INFORMATION PROCESSING SYSTEM, AND RECORDING MEDIUM

(71) Applicant: Kohji Yoshimura, Kanagawa (JP)

(72) Inventor: Kohji Yoshimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 405 days.

(21) Appl. No.: 18/048,499

(22) Filed: Oct. 21, 2022

(65) Prior Publication Data

US 2023/0147299 A1    May 11, 2023

(30) Foreign Application Priority Data

Nov. 5, 2021    (JP) ................... 2021-180960

(51) Int. Cl.
| | |
|---|---|
| *H04W 48/18* | (2009.01) |
| *H04W 24/08* | (2009.01) |
| *H04W 24/10* | (2009.01) |

(52) U.S. Cl.
CPC .......... *H04W 48/18* (2013.01); *H04W 24/08* (2013.01); *H04W 24/10* (2013.01)

(58) Field of Classification Search
CPC ...... H04W 48/18; H04W 24/08; H04W 24/10
USPC ........................................................ 370/329
See application file for complete search history.

(56) References Cited

U.S. PATENT DOCUMENTS

| | | | | |
|---|---|---|---|---|
| 9,009,344 | B2 * | 4/2015 | Nassor | H04L 47/12 |
| | | | | 709/224 |
| 9,094,380 | B2 * | 7/2015 | Shinohara | H04L 67/00 |
| 2015/0302096 | A1 | 10/2015 | Iwasaki | |

FOREIGN PATENT DOCUMENTS

| | | | | | |
|---|---|---|---|---|---|
| JP | 10-283296 | | 10/1998 | | |
| JP | 2004-054382 | | 2/2004 | | |
| JP | 2014087024 | A * | 5/2014 | | |
| JP | 5561297 | B2 * | 7/2014 | .......... | G06F 3/1204 |
| JP | 2015-207088 | | 11/2015 | | |
| JP | 6100555 | B2 * | 3/2017 | | |
| JP | 6180225 | B2 * | 8/2017 | ......... | H04L 12/1432 |

\* cited by examiner

*Primary Examiner* — Mong-Thuy T Tran
(74) *Attorney, Agent, or Firm* — XSENSUS LLP

(57) ABSTRACT

An information processing apparatus includes: circuitry that measures at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals, determines, from among the plurality of servers, a corresponding server that is to be a communication counterpart of each of the one or more information terminals, based on at least one of the first communication speeds or the one or more second communication speeds, and notifies each of the one or more information terminals of the corresponding server determined to be the communication counterpart of the information terminal.

16 Claims, 9 Drawing Sheets

FIG. 6

|  | PC 30a | PC 30b | PC 30c | PC 30d |
|---|---|---|---|---|
|  | 20 SECONDS | 30 SECONDS | 40 SECONDS | 50 SECONDS |
| GROUP A | YES |  |  | YES |
| GROUP B |  | YES | YES |  |

FIG. 9

|  | PC 30a | PC 30b | PC 30c | PC 30d | PC 30e | PC 30f | PC 30g |
|---|---|---|---|---|---|---|---|
| SERVER 20a | 50 | 60 | 70 | 80 | 90 | 100 | 110 |
| SERVER 20b | 20 | 30 | 40 | 50 | 60 | 70 | 80 |

FIG. 10

|  | PC 30a | PC 30b | PC 30c | PC 30d | PC 30e | PC 30f | PC 30g | TOTAL TIME |
|---|---|---|---|---|---|---|---|---|
| SERVER 20a | /// | 60 | 70 | /// | 90 | /// | /// | 220 |
| SERVER 20b | 20 | /// | /// | 50 | /// | 70 | 80 | 220 |

FIG. 11

|  | 0–4 SEC. | 5–9 SEC. | 10–14 SEC. | 15–19 SEC. | 20–24 SEC. | 25–29 SEC. | 30–34 SEC. |
|---|---|---|---|---|---|---|---|
| PC 30a | 1 | 3 | 8 | 3 | 6 | 4 | 8 |
| PC 30b | 2 | 1 | 2 | 6 | 2 | 5 | 6 |
| PC 30c | 3 | 2 | 6 | 1 | 8 | 7 | 1 |
| PC 30d | 4 | 8 | 1 | 4 | 5 | 1 | 4 |
| PC 30e | 8 | 5 | 4 | 5 | 1 | 2 | 5 |
| PC 30f | 6 | 7 | 3 | 7 | 3 | 8 | 2 |
| PC 30g | 7 | 6 | 5 | 8 | 7 | 3 | 7 |
| PC 30h | 5 | 4 | 7 | 2 | 4 | 6 | 3 |

INFORMATION PROCESSING APPARATUS, INFORMATION PROCESSING SYSTEM, AND RECORDING MEDIUM

CROSS-REFERENCE TO RELATED APPLICATIONS

This patent application is based on and claims priority pursuant to 35 U.S.C. § 119(a) to Japanese Patent Application No. 2021-180960, filed on Nov. 5, 2021, in the Japan Patent Office, the entire disclosure of which is hereby incorporated by reference herein.

BACKGROUND

Technical Field

The present disclosure relates to an information processing apparatus, an information processing system, and a recording medium.

Related Art

In the related art, techniques are known in which when a plurality of users concurrently access a plurality of servers to refer to an identical file, which of the servers is optimum for each of the users to access is determined based on a communication speed.

For example, a technique is disclosed in which a server that is optimum for using a plurality of servers to improve data processing efficiency and use efficiency of the plurality of servers is selected to select a server with a highest communication speed.

However, in the above-described technique, when a plurality of users concurrently access an identical file in the plurality of servers, a server with the highest communication speed at that timing, that is, the same server, is selected. This leads to an increase in communication traffic of the selected server and thus a decrease in communication speed of the entire system.

SUMMARY

According to an embodiment of the present disclosure, an information processing apparatus is provided which includes circuitry that measures at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals; determines, from among the plurality of servers, a corresponding server that is to be a communication counterpart of each of the one or more information terminals, based on at least one of the first communication speeds or the one or more second communication speeds; and notifies each of the one or more information terminals of the corresponding server determined to be the communication counterpart of the information terminal.

According to an embodiment of the present disclosure, an information processing system is provided which includes circuitry that measures at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals; determines, from among the plurality of servers, a corresponding server that is to be a communication counterpart of each of the one or more information terminals, based on at least one of the first communication speeds or the one or more second communication speeds, and notifies each of the one or more information terminals of the corresponding server determined to be the communication counterpart of the information terminal.

According to an embodiment of the present disclosure, a non-transitory recording medium is provided, storing a plurality of instructions which, when executed by one or more processors, causes the processors to perform an information processing method including measuring at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals; determining, from among the plurality of servers, a corresponding server that is to be a communication counterpart of each of the one or more information terminals, based on at least one of the first communication speeds or the one or more second communication speeds; and notifying each of the one or more information terminals of the corresponding server determined to be the communication counterpart of the information terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram for describing an example of a result of grouping the PCs permitted to communicate with the server in accordance with the communication speeds of the respective PCs in the information processing system according to the embodiment;

FIG. 9 is a diagram for describing an example of obtained communication speeds between the servers and the PCs in the information processing system according to the embodiment;

FIG. 10 is a diagram for describing an example of a result of grouping the PCs that are to communicate with each of the servers in accordance with the communication speeds between the servers and the PCs in the information processing system according to the embodiment; and FIG. 11 is a diagram for describing an operation of changing PCs that are to communicate with each of servers in accordance with changes in communication speeds of the respective PCs over time in the information processing system according to the embodiment.

Figure 1:
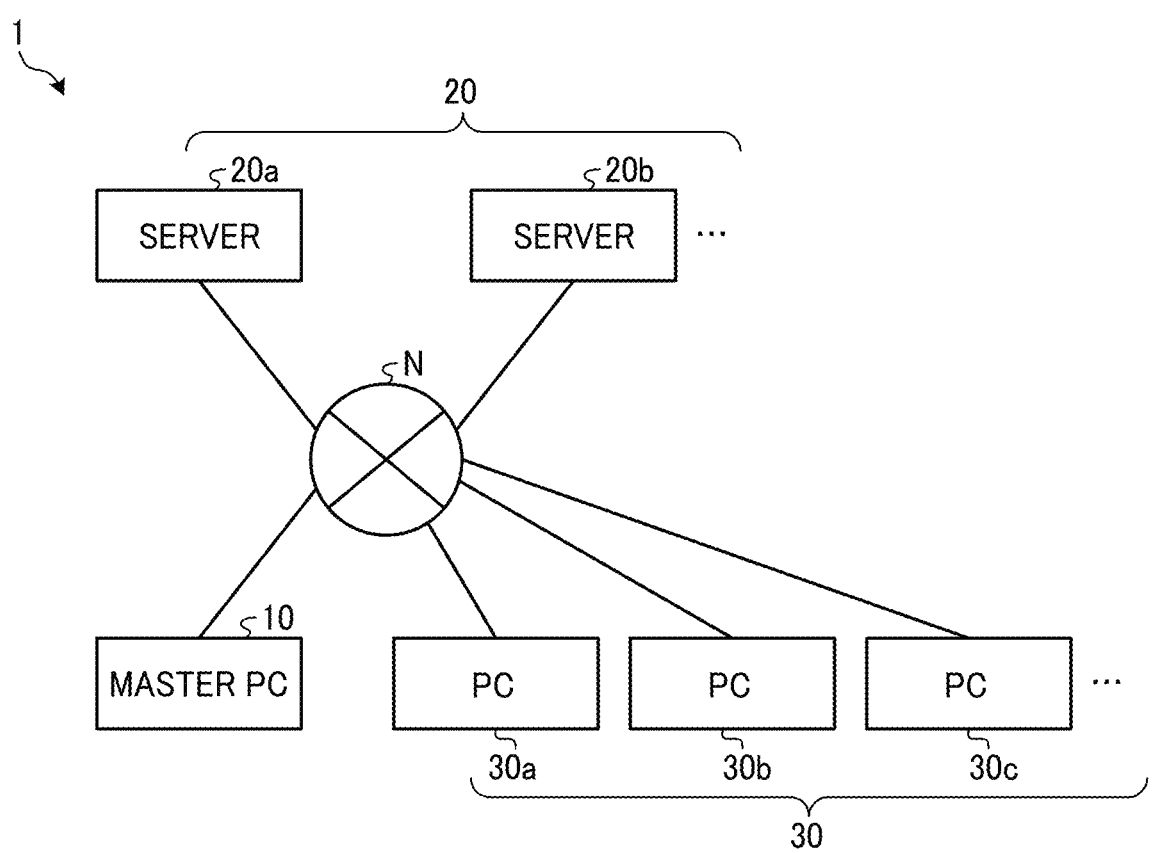
FIG. 1 is a diagram illustrating an example of a general arrangement of an information processing system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing system, an information processing method, and a program according to an embodiment of the present disclosure are described in detail below with reference to the accompanying drawings. The present disclosure, however, is not limited to the embodiment below, and the constituent elements in the embodiment below include those easily conceivable by persons skilled in the art, those being substantially the same ones, and those being within equivalent ranges. Various omissions, substitutions, changes, and combinations of the constituent elements may be made without departing from the gist of the embodiment below.

General Arrangement of Information Processing System

FIG. 1 is a diagram illustrating an example of a general arrangement of an information processing system according to an embodiment of the disclosure. A description is given of a general arrangement of an information processing system 1 according to the embodiment of the present disclosure with reference to FIG. 1.

As illustrated in FIG. 1, the information processing system 1 includes a master PC 10, servers 20a and 20b, and PCs 30a to 30c. The master PC 10, the servers 20a and 20b, and the PCs 30a to 30c perform data communication via a network N. The network N is a network including a local area network (LAN), a wide area network (WAN), or Internet. The network N may be a wired network or a wireless network. FIG. 1 illustrates two servers, i.e., the servers 20a and 20b. However, the number of servers is not limited to two, and the information processing system 1 may include three or more servers. Any server among the servers 20a and 20b is referred to simply as "server 20". In addition, the servers 20a and 20b are collectively referred to simply as "servers 20". FIG. 1 illustrates three PCs, i.e., the PCs 30a to 30c. However, the number of PCs is not limited to three, and the information processing system 1 may include two PCs or four or more PCs. Any PC among the PCs 30a to 30c is referred to simply as "PC 30". In addition, the PCs 30a to 30c are collectively referred to simply as "PCs 30".

The master PC 10 is an information processing apparatus that measures communication speeds of the respective servers 20 and communication speeds of the respective PCs 30 and determines which of the servers 20 each of the PCs 30 is to communicate with. The master PC 10 is not limited to a PC and may be an information processing apparatus of another type such as a workstation or a tablet terminal.

Each of the plurality of servers 20 is a server device such as a file server that stores data of an identical file or the like. In response to a download request from any of the PCs 30, each of the servers 20 transmits target data to the PC 30.

Each of the plurality of PCs 30 is an information terminal used by a user. When downloading specific data, each of the plurality of PCs 30 transmits a download request for the specific data to the server 20 which the PC 30 is notified of by the master PC 10 among the plurality of servers 20. Downloading is described as an example of communication performed between the PCs 30 and the servers 20. Alternatively, the communication may be uploading of data from the PCs 30 to the servers 20. In the description below, the communication performed between the PCs 30 and the servers 20 is downloading. Each of the PCs 30 is not limited to a PC and may be an information terminal of another type such as a workstation or a tablet terminal.

Overview of Operation of Information Processing System

Figure 2:
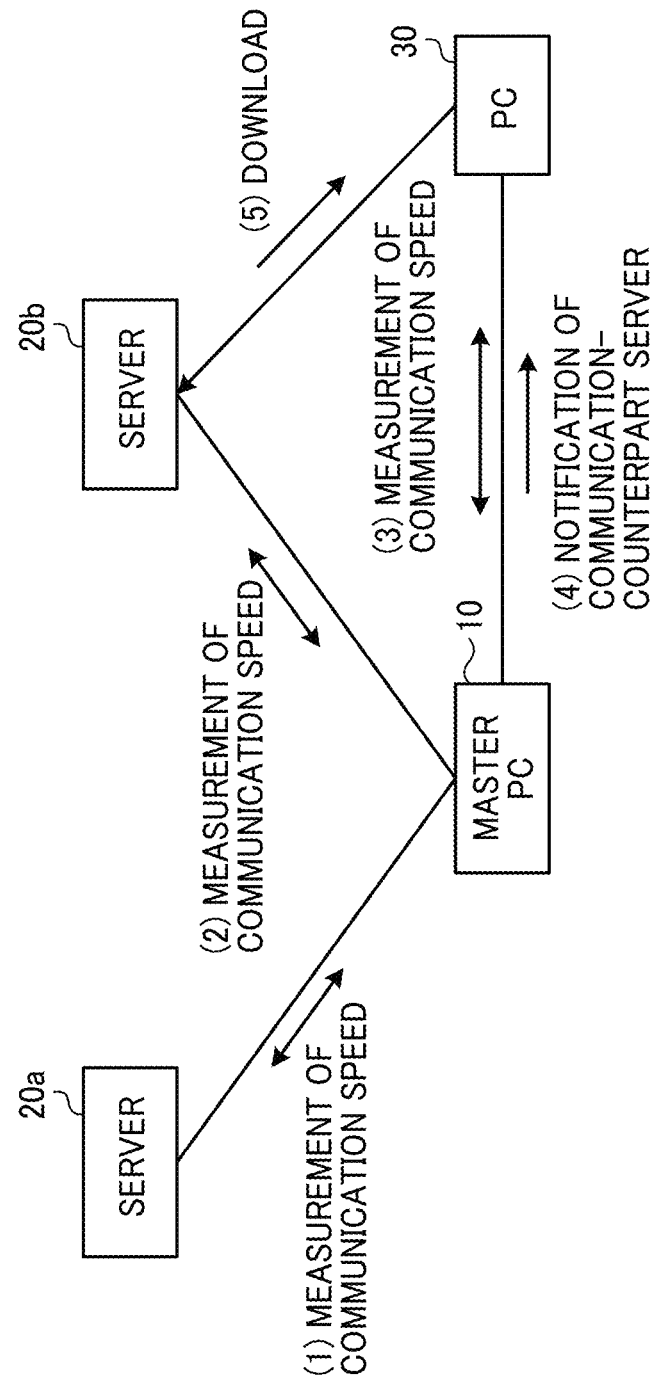
FIG. 2 is a diagram for describing an overview of an operation of the information processing system according to the embodiment.

FIG. 2 is a diagram for describing an overview of an operation of the information processing system according to the embodiment. A description is given of an overview of an operation of the information processing system 1 according to the embodiment with reference to FIG. 2.

The master PC 10 in the information processing system 1 measures a communication speed between the master PC 10 and the server 20a ((1) measurement of communication speed). The master PC 10 also measures a communication speed between the master PC 10 and the server 20b ((2) measurement of communication speed). In this manner, the master PC 10 recognizes the communication speeds of the respective servers 20.

The master PC 10 measures a communication speed between the master PC 10 and the PC 30 ((3) measurement of communication speed). FIG. 2 illustrates just one PC 30, which is one of the plurality of PCs 30. In this manner, the master PC 10 recognizes the communication speeds of the respective PCs 30.

For each of the PCs 30, the master PC 10 determines the server 20 that is to be a communication counterpart of the PC 30, that is, the server 20 which the PC 30 is to communicate with, based on at least one of the communication speeds of the respective servers 20 or the communication speeds of the respective PCs 30, and notifies the PC 30 of information on the server 20 ((4) notification of communication-counterpart server). This allows each of the PCs 30 to recognize the server 20, among the plurality of servers 20, from which the PC 30 is to download data in order to suppress a decrease in communication speed of the entire information processing system 1.

The PC 30 transmits a download request for the desired data to the server 20 which the PC 30 is notified of by the master PC 10, and downloads the data from the server 20 ((5) download).

Hardware Configuration of Master PC

Figure 3:
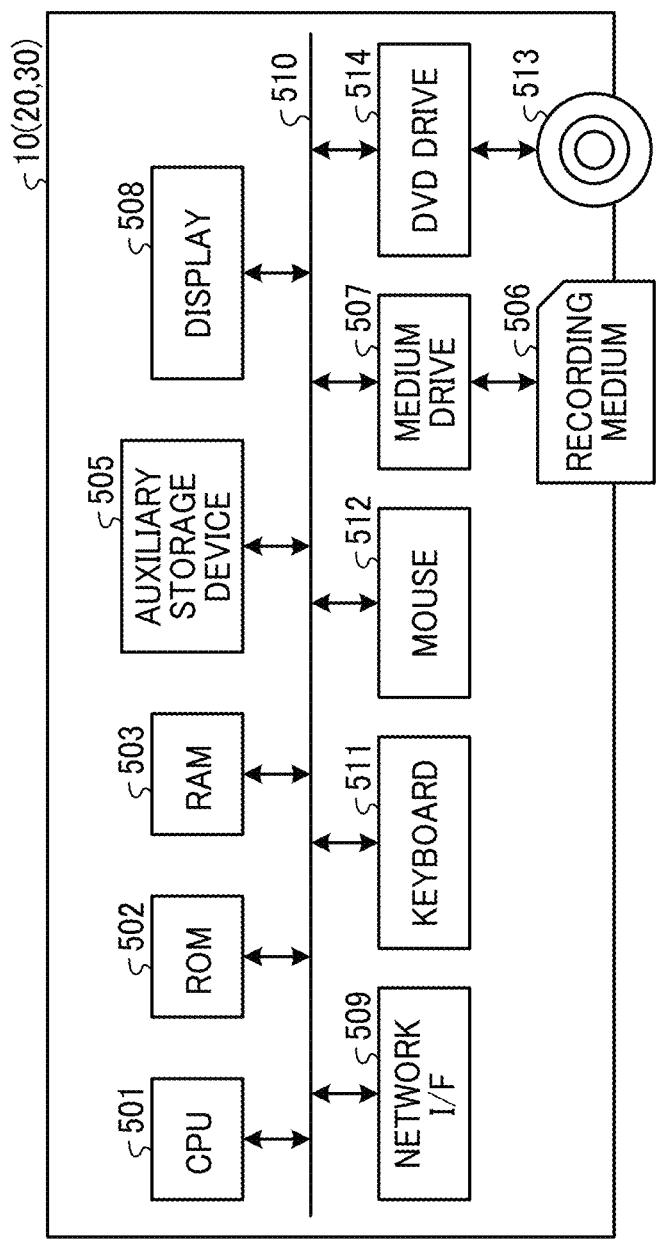
FIG. 3 is a diagram illustrating an example of a hardware configuration of a master personal computer (PC) according to the embodiment.

FIG. 3 is a diagram illustrating an example of a hardware configuration of the master PC according to the embodiment. A description is given of the hardware configuration of the master PC 10 according to the embodiment with reference to FIG. 3.

As illustrated in FIG. 3, the master PC 10 includes a central processing unit (CPU) 501, a read-only memory (ROM) 502, a random access memory (RAM) 503, an auxiliary storage device 505, a medium drive 507, a display 508, a network interface (I/F) 509, a keyboard 511, a mouse 512, and a digital versatile disc (DVD) drive 514.

The CPU 501 is an arithmetic device that controls operations of the entire master PC 10. The ROM 502 is a nonvolatile storage device that stores a program such as an initial program loader (IPL) that is executed by the CPU 501 initially. The RAM 503 is a volatile storage device used as a work area for the CPU 501.

The auxiliary storage device 505 is a nonvolatile storage device that stores various kinds of data such as a program. The auxiliary storage device 505 is, for example, a hard disk drive (HDD) or a solid state device (SSD).

The medium drive 507 is a device that controls reading of data from or writing of data to a recording medium 506 such as a flash memory.

The display 508 is a liquid crystal display (LCD), an organic electroluminescence (EL) display, or the like that displays various kinds of information such as a cursor, a menu, a window, characters, or an image.

The network I/F 509 is an interface for performing data communication via the network N. The network I/F 509 is, for example, a network interface card (NIC) that enables communication according to Transmission Control Protocol/Internet Protocol (TCP/IP). The network I/F 509 may be a communication interface having a wireless communication function based on a standard such as Wi-Fi®.

The keyboard 511 is an example of an input device including a plurality of keys with which characters, numerical values, or various instructions are input. The mouse 512 is an example of an input device with which any of various instructions is selected or executed, a target of processing is selected, or a cursor is moved, for example.

The DVD drive 514 is a device that controls reading of various kinds of data from or writing of various kinds of data to a DVD 513 that is an example of a removable storage medium. The DVD 513 is, for example, a digital versatile disc-rewritable (DVD-RW) or a digital versatile disc-recordable (DVD-R). The DVD 513 may be a compact disc-rewritable (CD-RW) or a compact disc-recordable (CD-R). In such case, the DVD drive 514 may be implemented by a CD drive.

The CPU 501, the ROM 502, the RAM 503, the auxiliary storage device 505, the medium drive 507, the display 508, the network I/F 509, the keyboard 511, the mouse 512, and the DVD drive 514 are communicably coupled to one another by a bus line 510 including an address bus, a data bus, and the like.

The hardware configuration of the master PC 10 illustrated in FIG. 3 is an example. The master PC 10 does not necessarily include all the constituent devices or may include another constituent device. The servers 20 and the PCs 30 each have a hardware configuration substantially the same as the hardware configuration illustrated in FIG. 3.

Configuration and Operation of Functional Blocks of Master PC

Figure 4:
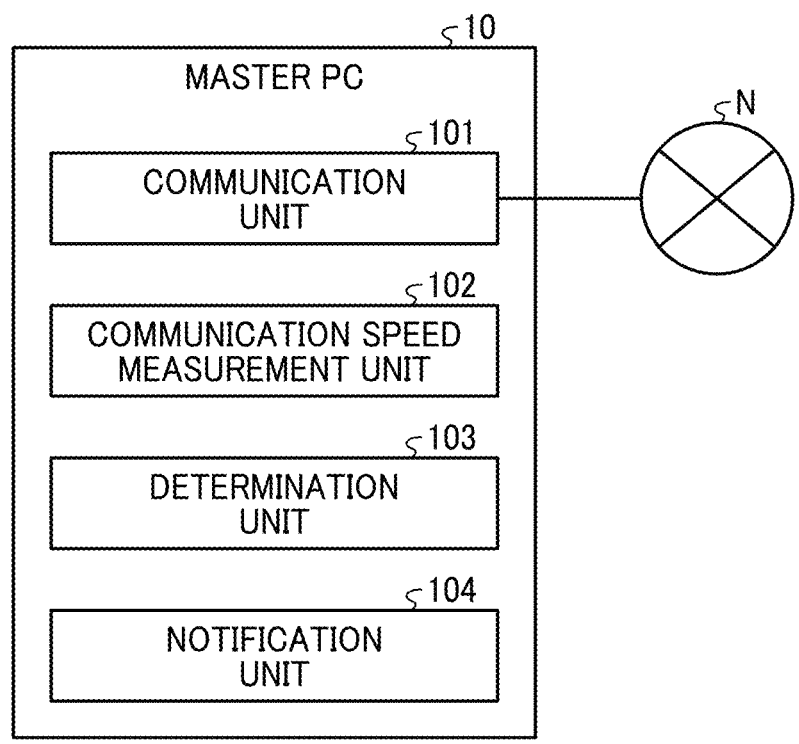
FIG. 4 is a diagram illustrating an example of a configuration of functional blocks of the master PC according to the embodiment.

FIG. 4 is a diagram illustrating an example of a configuration of functional blocks of the master PC according to the embodiment. A description is given of a configuration and an operation of the functional blocks of the master PC 10 according to the embodiment with reference to FIG. 4.

As illustrated in FIG. 4, the master PC 10 includes a communication unit 101, a communication speed measurement unit 102 (an example of measurement unit), a determination unit 103, and a notification unit 104.

The communication unit 101 is a functional unit that performs data communication with the servers 20 and the PCs 30. The communication unit 101 is implemented, for example, by the network I/F 509 illustrated in FIG. 3 and by execution of a program by the CPU 501 illustrated in FIG. 3.

The communication speed measurement unit 102 is a functional unit that measures communication speeds of the respective servers 20 and communication speeds of the respective PCs 30. For example, the communication speed measurement unit 102 may measure actual communication speeds between the master PC 10 and the respective servers 20 and between the master PC 10 and the respective PCs 30. The communication speed measurement unit 102 measures communication speeds between the servers 20 and the PCs 30 from the communication speeds of the respective servers 20 and the communication speeds of the respective PCs 30. For example, the communication speed measurement unit 102 may predict communication speeds between the servers 20 and the PCs 30, based on the communication speeds of the respective servers 20 and the communication speeds of the respective PCs 30. The communication speed measurement unit 102 may regard, as the communication speed between one server 20 among the servers 20 and one PC 30 among the PCs 30, a slower communication speed of the communication speed of the one server 20 and the communication speed of the one PC 30. The communication speed measurement unit 102 is implemented, for example, by execution of a program by the CPU 501 illustrated in FIG. 3.

The determination unit 103 is a functional unit that determines, for each of the PCs 30, the server 20 that is to be a communication counterpart of the PC 30, that is, the server 20 which the PC 30 is to communicate with, based on at least one of the communication speeds (first communication speeds) of the respective servers 20 measured by the communication speed measurement unit 102, the communication speeds (second communication speeds) of the respective PCs 30, or the communication speeds (third communication speeds) between the servers 20 and the PCs 30. The determination unit 103 is implemented, for example, by execution of a program by the CPU 501 illustrated in FIG. 3.

The notification unit 104 is a functional unit that notifies, via the communication unit 101, each of the PCs 30 of information on the server 20 determined to be the communication counterpart of the PC 30 by the determination unit 103. The notification unit 104 is implemented, for example, by execution of a program by the CPU 501 illustrated in FIG. 3.

The implementation of the communication speed measurement unit 102, the determination unit 103, and the notification unit 104 of the master PC 10 illustrated in FIG. 4 is not limited to implementation by execution of the respective programs by the CPU 501 illustrated in FIG. 3. For example, the communication speed measurement unit 102, the determination unit 103, and the notification unit 104 of the master PC 10 illustrated in FIG. 4 may be implemented by hardware such as an integrated circuit or by a combination of software and hardware.

The functional units of the master PC 10 illustrated in FIG. 4 are conceptually presented functions, and are not limited to such a configuration. For example, a plurality of functional units illustrated as independent functional units of the master PC 10 in FIG. 4 may be configured as a single functional unit. Conversely, the function of a single functional unit of the master PC 10 illustrated in FIG. 4 may be divided and configured as a plurality of functional units.

Each of the servers 20 or each of the PCs 30 may include the communication speed measurement unit 102, the determination unit 103, and the notification unit 104 included in the master PC 10. This allows the information processing system 1 to be built without preparing the master PC 10 that is an information processing apparatus different from the servers 20 and the PCs 30.

Figure 5:
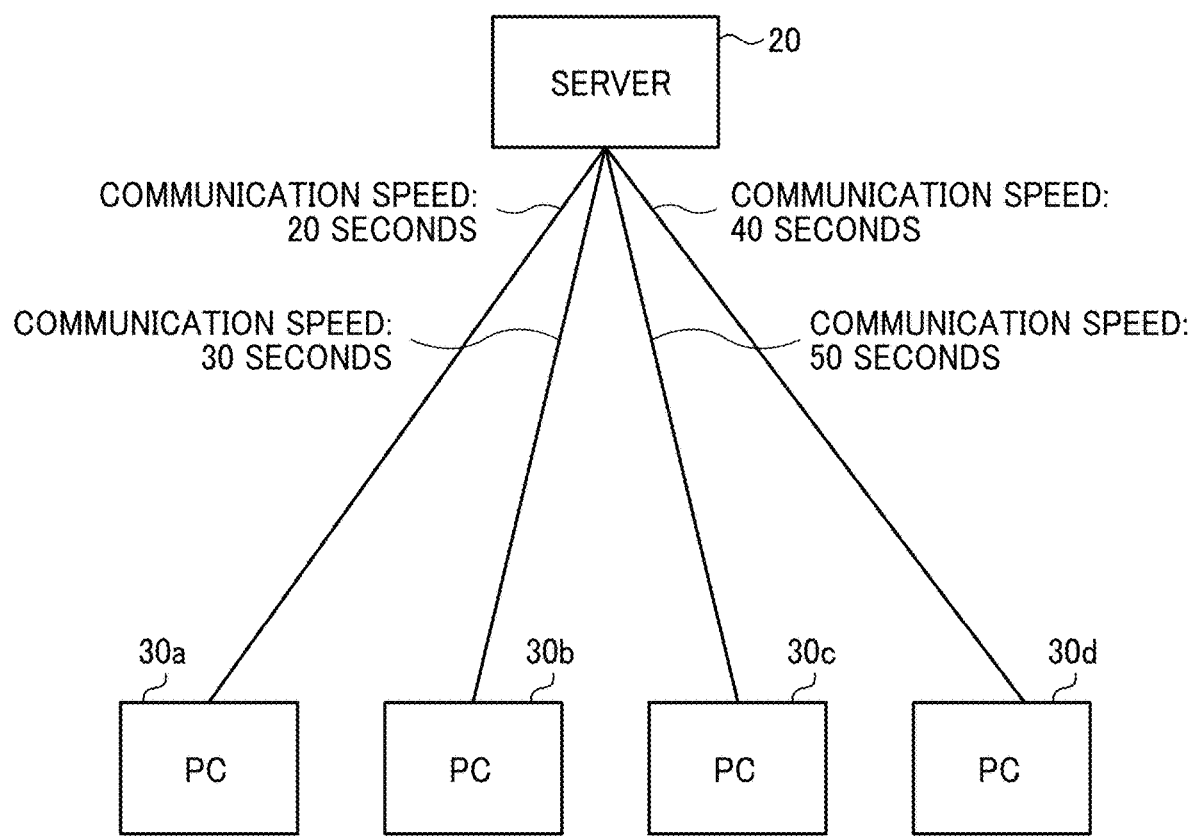
FIG. 5 is a diagram for describing an operation of grouping PCs permitted to communicate with a server in accordance with communication speeds of the respective PCs in the information processing system according to the embodiment.

Operation of Grouping PCs Permitted to Communicate with Server in Accordance with Communication Speeds of PCs FIG. 5 is a diagram for describing an operation of grouping PCs permitted to communicate with a server in accordance with communication speeds of the respective PCs in the information processing system according to the embodiment. FIG. 6 is a diagram for describing an example of a result of grouping the PCs permitted to communicate with the server in accordance with the communication speeds of the respective PCs in the information processing system according to the embodiment. With reference to FIGS. 5 and 6, a description is given of the operation of grouping the PCs 30 permitted to communicate with the server 20 in accordance with the communication speeds of the respective PCs 30 in the information processing system 1 according to the embodiment.

In FIG. 5, the server 20 has a narrow communication band. Thus, the number of PCs 30 permitted to concurrently communicate with the server 20 is limited to two. The time in seconds indicating the communication speed in FIG. 5 represents, for example, a time taken to complete downloading of certain data.

As illustrated in FIG. 5, the communication speed measurement unit 102 of the master PC 10 measures the communication speed of the PC 30a as 20 seconds, measures the communication speed of the PC 30b as 30 seconds, measures the communication speed of the PC 30c as 40 seconds, and measures the communication speed of the PC 30d as 50 seconds. In this case, to optimize the time taken to complete downloading of the certain data from the servers 20, the determination unit 103 of the master PC 10 puts the PCs 30a and 30d in a group A and puts the PCs 30b and 30c in a group B as illustrated in FIG. 6.

This makes the time taken by the PCs 30a and 30d to download the certain data from the server 20 equal to 70 seconds and makes the time taken by the PCs 30b and 30c to download the certain data from the server 20 equal to 70 seconds. Thus, the time taken for downloading in the entire information processing system 1 is successfully minimized. Consequently, a decrease in communication speed of the entire information processing system 1 is successfully suppressed.

Figure 7:
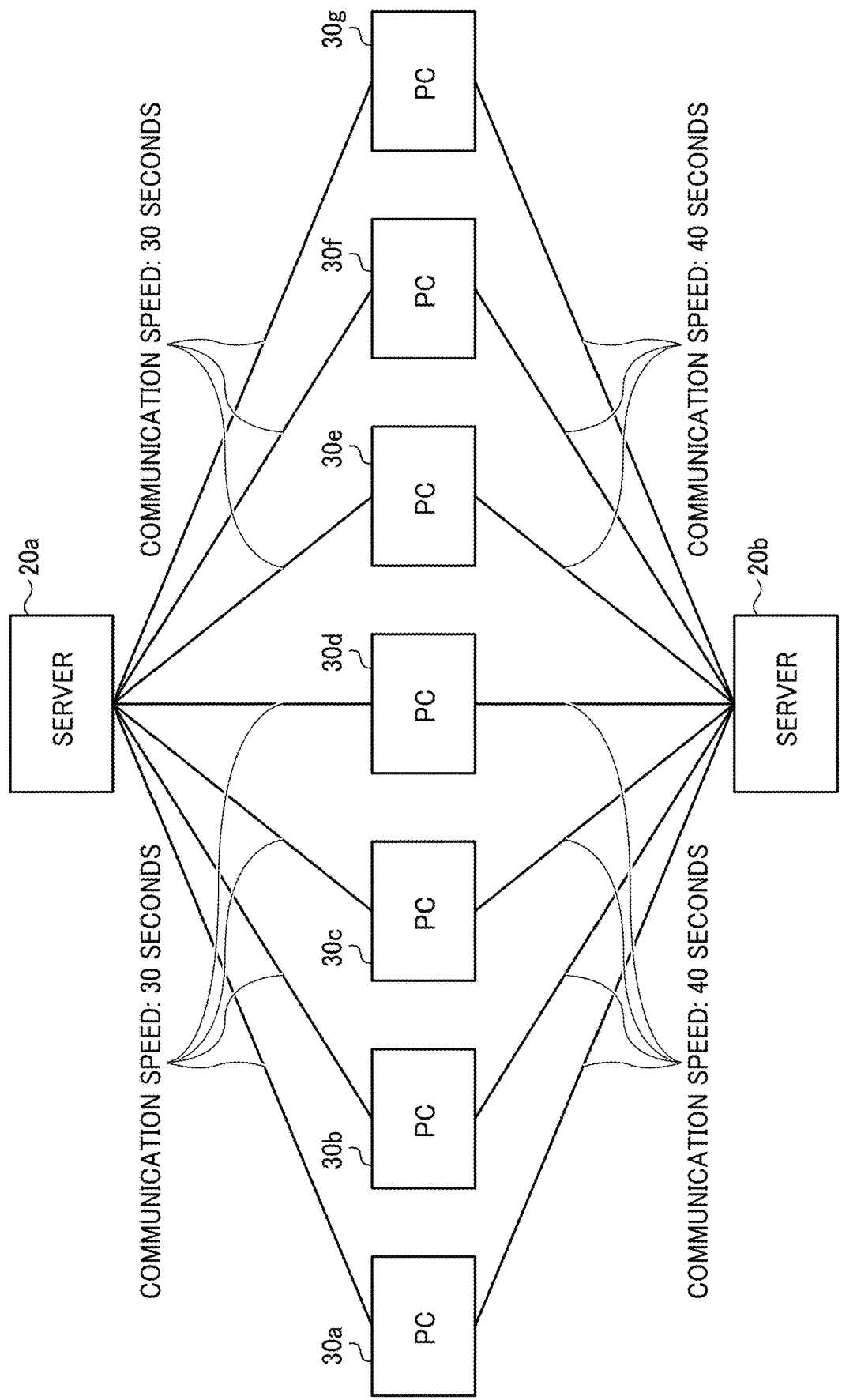
FIG. 7 is a diagram for describing an operation of grouping PCs that are to communicate with each of servers in accordance with communication speeds of the respective servers in the information processing system according to the embodiment.

Operation of Grouping PCs to Communicate with Each Server in Accordance with Communication Speeds of Servers FIG. 7 is a diagram for describing an operation of grouping PCs that are to communicate with each of servers in accordance with communication speeds of the respective servers in the information processing system according to the embodiment. With reference to FIG. 7, a description is given of an operation of grouping the PCs 30 that are to communicate with each of the servers 20 in accordance with the communication speeds of the respective server 20 in the information processing system 1 according to the embodiment. In FIG. 7, seven PCs 30 (PCs 30a to 30g) access the servers 20a and 20b. The time in seconds indicating the communication speed in FIG. 7 represents, for example, a time taken to complete downloading of certain data.

As illustrated in FIG. 7, the communication speed measurement unit 102 measures the communication speed of the server 20a as 30 seconds and measures the communication speed of the server 20b as 40 seconds. In this case, to optimize the time taken to complete downloading of the certain data from the servers 20, the determination unit 103 determines that the PCs 30a to 30d are to communicate with the server 20a and the PCs 30e to 30g are to communicate with the server 20b as illustrated in FIG. 7. The notification unit 104 notifies each of the PCs 30a to 30d of information on the server 20a that is the communication counterpart and notifies each of the PCs 30e to 30g of information on the server 20b that is the communication counterpart.

This makes the time taken for downloading from the server 20a equal to 30 seconds×4=120 seconds and makes the time taken for downloading from the server 20b equal to 40 seconds×3=120 seconds. Thus, the time taken for downloading in the entire information processing system 1 is successfully minimized. Consequently, when the plurality of PCs 30 access the plurality of servers 20, a decrease in communication speed of the entire information processing system 1 is successfully suppressed.

Figure 8:
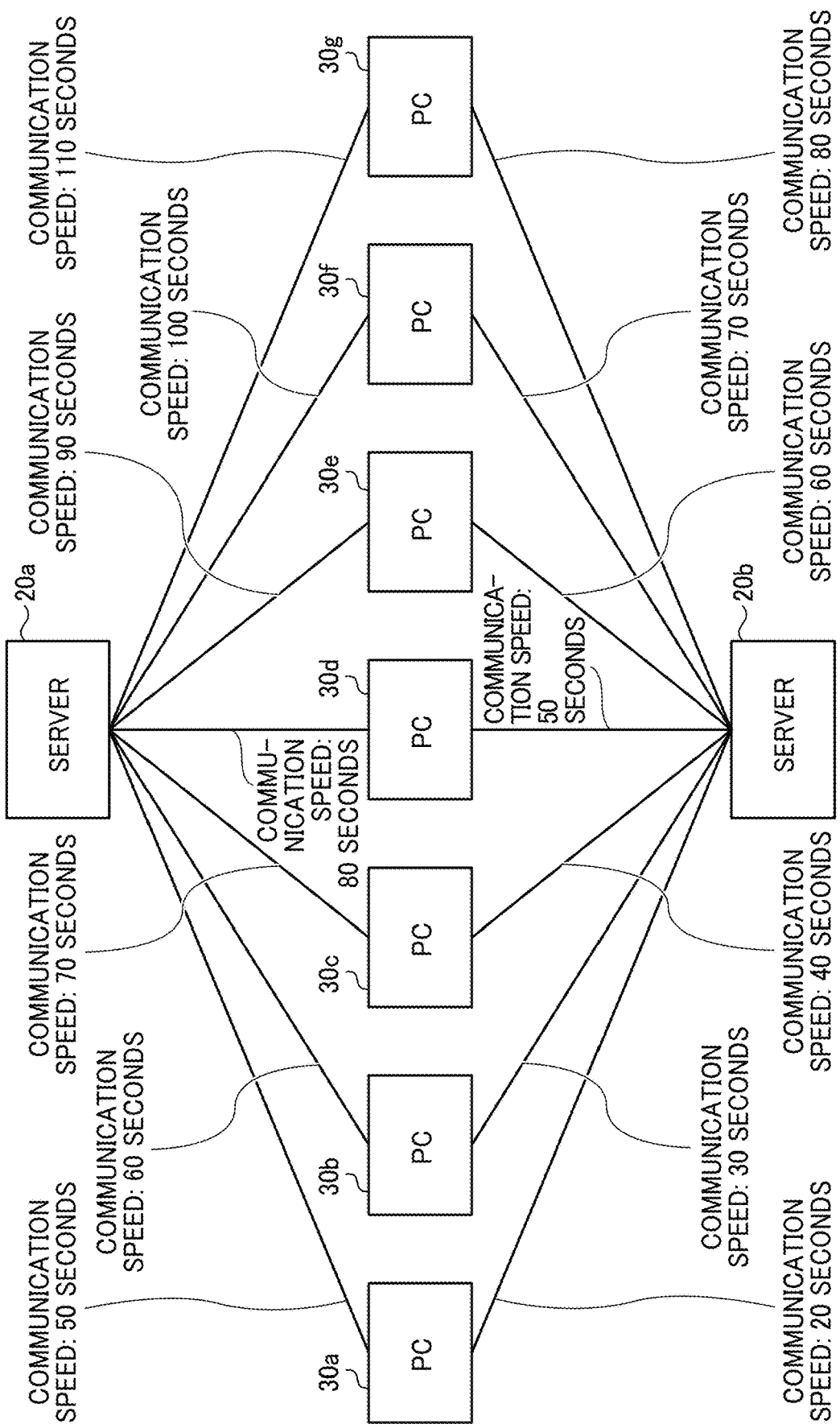
FIG. 8 is a diagram for describing an operation of grouping PCs that are to communicate with each of servers in accordance with communication speeds between the servers and the PCs in the information processing system according to the embodiment.

Operation of Grouping PCs to Communicate with Each Server in Accordance with Communication Speeds between Servers and PCs FIG. 8 is a diagram for describing an operation of grouping PCs that are to communicate with each of servers in accordance with communication speeds between the servers and the PCs in the information processing system according to the embodiment. FIG. 9 is a diagram for describing an example of obtained communication speeds between the servers and the PCs in the information processing system according to the embodiment. FIG. 10 is a diagram for describing an example of a result of grouping the PCs that are to communicate with each of the servers in accordance with the communication speeds between the servers and the PCs in the information processing system according to the embodiment. With reference to FIGS. 8 to 10, a description is given of an operation of grouping the PCs 30 that are to communicate with each of the servers 20 in accordance with communication speeds between the servers 20 and the PCs 30 in the information processing system 1 according to the embodiment. In FIG. 8, seven PCs 30 (PCs 30a to 30g) access the servers 20a and 20b. The time in seconds indicating the communication speed in FIGS. 8 to 10 represents, for example, a time taken to complete downloading of certain data.

The communication speed measurement unit 102 measures communication speeds of the PCs 30a to 30g and communication speeds of the servers 20a and 20b, and based on these communication speeds, measures communication speeds between the servers 20 and the PCs 30. As a result, the communication speeds between the servers 20 and the PCs 30 are different from one another in the examples illustrated in FIGS. 8 and 9. For example, the communication speeds between the server 20*a* and the PCs 30*a*, 30*b*, 30*c*, 30*d*, 30*e*, 30*f*, and 30*g* are 50 seconds, 60 seconds, 70 seconds, 80 seconds, 90 seconds, 100 seconds, and 110 seconds, respectively. In this case, to optimize the time taken to complete downloading of the certain data from the servers 20*a* and 20*b*, the determination unit 103 assigns the PCs 30 to the servers 20*a* and 20*b* so that the time taken by the seven PCs 30 to download the certain data from the servers 20*a* and 20*b* is minimized. For example, the determination unit 103 determines that the PCs 30*b*, 30*c*, and 30*e* are to communicate with the server 20*a* and the PCs 30*a*, 30*d*, 30*f*, and 30*g* are to communicate with the server 20*b* as illustrated in FIG. 10. The notification unit 104 notifies each of the PCs 30*b*, 30*c*, and 30*e* of information on the server 20*a* that is the communication counterpart and notifies each of the PCs 30*a*, 30*d*, 30*f*, and 30*g* of information on the server 20*b* that is the communication counterpart.

This makes the time taken for downloading from the server 20*a* equal to 60 seconds+70 seconds+90 seconds=220 seconds and makes the time taken for downloading from the server 20*b* equal to 20 seconds+50 seconds+70 seconds+80 seconds=220 seconds. Thus, the times taken for downloading from the servers 20*a* and 20*b* are equal to each other, and the time taken for downloading in the entire information processing system 1 is successfully minimized. Consequently, when the plurality of PCs 30 access the plurality of servers 20, a decrease in communication speed of the entire information processing system 1 is successfully suppressed.

Operation of Changing PCs to Communicate with Each Server in Accordance with Changes in Communication Speeds Over Time FIG. 11 is a diagram for describing an operation of changing PCs that are to communicate with each of servers in accordance with changes in communication speeds of the respective PCs over time in the information processing system according to the embodiment. With reference to FIG. 11, a description is given of an operation of changing the PCs 30 that are to communicate with each of the servers 20 in accordance with changes in communication speeds of the respective PCs 30 over time. In FIG. 11, eight PCs 30 (PCs 30*a* to 30*h*) access the servers 20*a* and 20*b*.

For example, the communication speed measurement unit 102 measures a communication speed of each of the PCs 30 at certain time intervals (for example, at intervals of 5 seconds). The determination unit 103 determines the rankings of the communication speeds measured by the communication speed measurement unit 102 at the certain time intervals. FIG. 11 illustrates the rankings of the communication speeds between the servers 20 and the respective PCs 30 that change over time at intervals of 5 seconds. In FIG. 11, "1" indicates the highest communication speed, and "8" indicates the lowest communication speed. The determination unit 103 changes assignment of the PCs 30 to the servers 20*a* and 20*b* at the certain time intervals such that the sum of the communication speeds of the PCs 30 whose communication counterpart is the server 20*a* is equal to the sum of the communication speeds of the PCs 30 whose communication counterpart is the server 20*b*. In the example illustrated in FIG. 11, the determination unit 103 assigns the PCs 30 with the communication speed rankings "1", "3", "5", and "7" to the server 20*a*, and assigns the PCs 30 with the communication speed rankings "2", "4", "6", and "8" to the server 20*b*. The term "equal" does not indicate that the sums of the communication speeds are strictly equal to each other but rather indicates a concept including a case where the sums are equal to and substantially equal to each other. The notification unit 104 notifies each of the PCs 30 of information on the server 20 assigned by the determination unit 103.

In the example illustrated in FIG. 11, the determination unit 103 assigns the four PCs 30 to each of the servers 20*a* and 20*b* based on the communication speed rankings. However, the manner in which the PCs 30 are assigned is not limited to assigning the same number of PCs 30 to each server. Thus, the number of PCs 30 assigned to each of the servers 20 is not limited to any number as long as the sums of the communication speeds are "equal" to each other. In the example illustrated in FIG. 11, the PCs 30 are assigned to each of the servers 20 based on the communication speeds of the PCs 30 measured by the communication speed measurement unit 102. However, the criteria used in the assigning is not limited to the communication speeds of the PCs 30, and the PCs 30 may be assigned to each of the servers 20 based on the communication speeds of the servers 20 measured by the communication speed measurement unit 102 or based on the communication speeds between the servers 20 and the PCs 30 measured by the communication speed measurement unit 102.

As described above, assignment of the PCs 30 is changed in accordance with the changes in the communication speeds over time such that the times taken for downloading from the respective servers 20*a* and 20*b* are "equal" to each other. Thus, the time taken for downloading in the entire information processing system 1 is successfully minimized. Consequently, when the plurality of PCs 30 access the plurality of servers 20, a decrease in communication speed of the entire information processing system 1 is successfully suppressed.

As described above, in the master PC 10 according to the embodiment, the communication speed measurement unit 102 measures at least one of communication speeds of the respective servers 20 or communication speeds of the respective PCs 30, the determination unit 103 determines the corresponding server 20 that is to be a communication counterpart of each of the PCs 30 based on at least one of the communication speeds of the respective servers 20 or the communication speeds of the respective PCs 30, and the notification unit 104 notifies each of the PCs 30 of the corresponding server 20 determined to be the communication counterpart by the determination unit 103. Thus, when the plurality of PCs 30 access the plurality of servers 20, a decrease in communication speed of the entire information processing system 1 is successfully suppressed.

Each of the functions of the above-described embodiment can be implemented by one or more processing circuits. Herein, examples of the "processing circuits" include a processor programmed to implement the functions based on software such as a processor implemented by an electronic circuit, and devices such as an application specific integrated circuit (ASIC), a digital signal processor (DSP), a field-programmable gate array (FPGA), and a circuit module of the related art that are designed to implement the functions described above.

The programs executed by the master PC 10 in the above-described embodiment may be preinstalled in the ROM or the like and provided to the master PC 10.

The programs executed by the master PC 10 in the above-described embodiment may be stored as a file in an installable format or an executable format on a computerreadable recording medium such as a CD-ROM, a flexible disk (FD), a CD-R, or a DVD and may be provided as a computer program product.

The programs executed by the master PC 10 in the above-described embodiment may be stored on a computer connected to a network such as the Internet and may be downloaded via the network and provided to the master PC 10. The programs executed by the master PC 10 in the above-described embodiment may be provided or distributed via a network such as the Internet.

The programs executed by the master PC 10 in the above-described embodiment have a module configuration including the functional units described above. The CPU (processor) that is actual hardware reads the programs from the ROM and executes the program, so that the functional units described above are loaded to a main storage device and are generated in the main storage device.

In one embodiment, an information processing method includes measuring at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals; determining, from among the plurality of servers, a corresponding server that is to be a communication counterpart of each of the one or more information terminals, based on at least one of the first communication speeds or the one or more second communication speeds; and notifying each of the one or more information terminals of the corresponding server determined to be the communication counterpart of the information terminal.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising: circuitry configured to measure at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals, determine, from among the plurality of servers, a corresponding server that is to be a communication counterpart of each of the one or more information terminals, based on at least one of the first communication speeds or the one or more second communication speeds, notify each of the one or more information terminals of the corresponding server determined to be the communication counterpart of the information terminal, measure the first communication speeds and the one or more second communication speeds, measure third communication speeds between the plurality of servers and the one or more information terminals, based on the first communication speeds and the one or more second communication speeds, and determine, from among the plurality of servers, the corresponding server that is to be a communication counterpart of each of the one or more information terminals, based on the third communication speeds.

2. The information processing apparatus according to claim 1, wherein the circuitry is further configured to:
measure at least the one or more second communication speeds, and
determine, from among the plurality of servers, the corresponding server that is to be a communication counterpart of each of the one or more information terminals, based on the one or more second communication speeds.

3. The information processing apparatus according to claim 1, wherein the circuitry is further configured to:
measure at least the first communication speeds, and
determine, from among the plurality of servers, the corresponding server that is to be a communication counterpart of each of the one or more information terminals, based on the first communication speeds.

4. The information processing apparatus according to claim 1, wherein the circuitry is further configured to:
change assignment of the one or more information terminals to the plurality of servers in accordance with at least one of changes in the first communication speeds over time or changes in the one or more second communication speeds over time.

5. The information processing apparatus according to claim 1, wherein the circuitry is further configured to:
measure at least one of the first communication speeds or the one or more second communication speeds, based on respective times for uploading data.

6. An information processing system comprising:
the information processing apparatus according to claim 1;
the plurality of servers; and
the one or more information terminals.

7. An information processing system comprising:
circuitry configured to
measure at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals, determine, from among the plurality of servers, a corresponding server that is to be a communication counterpart of each of the one or more information terminals, based on at least one of the first communication speeds or the one or more second communication speeds, and notify each of the one or more information terminals of the corresponding server determined to be the communication counterpart of the information terminal, measure the first communication speeds and the one or more second communication speeds, measure third communication speeds between the plurality of servers and the one or more information terminals, based on the first communication speeds and the one or more second communication speeds, and determine, from among the plurality of servers, the corresponding server that is to be a communication counterpart of each of the one or more information terminals, based on the third communication speeds.

8. The information processing system according to claim 7, wherein the circuitry is further configured to:

measure at least the one or more second communication speeds, and determine, from among the plurality of servers, the corresponding server that is to be a communication counterpart of each of the one or more information terminals, based on the one or more second communication speeds.

9. The information processing system according to claim 7, wherein the circuitry is further configured to:

measure at least the first communication speeds, and determine, from among the plurality of servers, the corresponding server that is to be a communication counterpart of each of the one or more information terminals, based on the first communication speeds.

10. The information processing system according to claim 7, wherein the circuitry is further configured to:

change assignment of the one or more information terminals to the plurality of servers in accordance with at least one of changes in the first communication speeds over time or changes in the one or more second communication speeds over time.

11. The information processing system according to claim 7, wherein the circuitry is further configured to:

measure at least one of the first communication speeds or the one or more second communication speeds, based on respective times for uploading data.

12. A non-transitory recording medium which stores a plurality of instructions, when executed by one or more processors, causes the processors to perform an information processing method comprising:

measuring at least one of first communication speeds of a plurality of servers that store identical data or one or more second communication speeds of one or more information terminals that access the identical data in at least one of the plurality of servers, each of the first communication speeds corresponding to a respective one of the plurality of servers, each of the one or more second communication speeds corresponding to a respective one of the one or more information terminals;

determining, from among the plurality of servers, a corresponding server that is to be a communication counterpart of each of the one or more information terminals, based on at least one of the first communication speeds or the one or more second communication speeds;

notifying each of the one or more information terminals of the corresponding server determined to be the communication counterpart of the information terminal;

measuring the first communication speeds and the one or more second communication speeds;

measuring third communication speeds between the plurality of servers and the one or more information terminals, based on the first communication speeds and the one or more second communication speeds; and determining, from among the plurality of servers, the corresponding server that is to be a communication counterpart of each of the one or more information terminals, based on the third communication speeds.

13. The non-transitory recording medium according to claim 12, wherein the information processing method further comprises:

measuring at least the one or more second communication speeds; and determining, from among the plurality of servers, the corresponding server that is to be a communication counterpart of each of the one or more information terminals, based on the one or more second communication speeds.

14. The non-transitory recording medium according to claim 12, wherein the information processing method further comprises:

measuring at least the first communication speeds, and determining, from among the plurality of servers, the corresponding server that is to be a communication counterpart of each of the one or more information terminals, based on the first communication speeds.

15. The non-transitory recording medium according to claim 12, wherein the information processing method further comprises:

changing assignment of the one or more information terminals to the plurality of servers in accordance with at least one of changes in the first communication speeds over time or changes in the one or more second communication speeds over time.

16. The non-transitory recording medium according to claim 12, wherein the information processing method further comprises:

measuring at least one of the first communication speeds or the one or more second communication speeds, based on respective times for uploading data.

* * * * *